(12) United States Patent
Pengkuson et al.

(10) Patent No.: US 6,206,054 B1
(45) Date of Patent: Mar. 27, 2001

(54) AUTOMATIC COMPOUND SHAKING MACHINE

(75) Inventors: Somchai Pengkuson; Surachat Tapimai; Sakda Yindee, all of Pathumthani (TH)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/451,078

(22) Filed: Nov. 30, 1999

(51) Int. Cl.$^7$ .................. B65B 1/04; B65B 3/04
(52) U.S. Cl. .................. 141/2; 141/18; 141/72; 141/75; 141/351; 141/369; 141/371; 141/373; 141/391; 366/111
(58) Field of Search .................. 141/246–250, 141/271, 272, 283, 72, 73, 75, 18, 2, 346, 351, 369, 371, 373, 391; 53/390; 222/196, 199, 200; 366/111

(56) References Cited

U.S. PATENT DOCUMENTS

| | | | |
|---|---|---|---|
| 4,002,270 | 1/1977 | Reiner | 222/58 |
| 4,084,390 | * 4/1978 | Schmachtel et al. | 53/112 A |
| 4,966,204 | * 10/1990 | Pedigo | 141/7 |
| 5,074,403 | 12/1991 | Myhre | 198/751 |
| 5,470,218 | 11/1995 | Hillman et al. | 425/144 |
| 5,651,401 | * 7/1997 | Cados | 141/129 |

* cited by examiner

*Primary Examiner*—Timothy L. Maust
(74) *Attorney, Agent, or Firm*—Duane Morris & Heckscher LLP; Steven E. Koffs

(57) ABSTRACT

In a method and system for loading a magazine capable of feeding the material into a molding machine, a material to be loaded is placed into a hopper above the magazine. The magazine is slidably seated on a slide plate. The slide plate is moved with a reciprocating motion, causing the magazine to move with a reciprocating motion, and causing the material to fall from the hopper to the magazine. The reciprocating motion of the magazine may be allowed to lag behind the reciprocating motion of the plate, and may, at times, include motion in a direction opposite that of the slide plate. The step of moving the slide plate may include rolling the plate on a plurality of bearings. The motion of the magazine may be limited relative to the slide plate, using at least one stop. A pneumatic cylinder may be included to actuate the at least one stop. The operation of the pneumatic cylinder may be controlled with a solenoid valve. Preferably, the method includes automatically blowing dust of the material from above the slide plate to a dust collecting space below the slide plate; and automatically vacuuming the dust from the dust collecting space. A sensor may be used to detect the presence of a person near the magazine 150, and automatically discontinuing the reciprocating motion of the slide plate 160 when the person is detected.

19 Claims, 4 Drawing Sheets

AUTOMATIC COMPOUND SHAKING MACHINE

FIELD OF THE INVENTION

The present invention relates to the field of feeding systems.

DESCRIPTION OF THE RELATED ART

A compound molding machine receives tablets of a molding compound, melts the tablets to form a "melt" and injects the melt into a mold. General principles of operation of a molding machine are described in U.S. Pat. No. 5,470,218, which is incorporated by reference herein in its entirety.

For some types of pelletized materials, a molding machine may be fed by a compound magazine. FIG. 6 shows a cut-away view of a conventional compound magazine 150. The magazine 150 has a plurality of elongated tubes 152 for receiving compound tablets. The magazine 150 has a plurality of openings 151 on its top surface, through which the tablets are inserted into the tubes. Once the magazine 150 is full, it is coupled to the molding machine, to feed the tablets.

The tablets are loaded into the tubes manually. A hopper containing the tablets is placed on top of the magazine 150. The operator has to shake the magazine and hopper till the tablets fall through the openings 151 into the tubes 152. Manual loading of the compound magazine 150 is a very time consuming process. Experience has shown that this manual loading procedure may take approximately ten minutes per magazine. For a single molding machine, up to two hours per day of processing time may be lost due to delays in manually filling the compound magazine 150.

In addition to being time consuming, manual loading of the compound magazine generates a large amount of dust, and the work itself causes worker fatigue. A system and method is desired for relieving the worker from the arduous task of manually loading the compound tablets into the magazine.

SUMMARY OF THE INVENTION

One aspect of the present invention is a feeding system including a hopper for containing material and a magazine, into which the material is fed by the hopper. The magazine is capable of feeding the material into a molding machine. The magazine is slidably seated on a reciprocating plate. The reciprocating motion of the plate causes the magazine to move with a reciprocating motion, thereby causing the material to fall from the hopper to the magazine.

Another aspect of the invention is a method for loading a magazine capable of feeding material into a molding machine. The material is loaded into a hopper above the magazine. A plate is moved with a reciprocating motion. The magazine is slidably seated on the plate, so that the reciprocating motion of the plate causes the magazine to move with a reciprocating motion, thereby causing the material to fall from the hopper to the magazine.

These and other aspects of the invention are described below with reference to the drawings and the exemplary embodiment.

DETAILED DESCRIPTION

Figure 1:
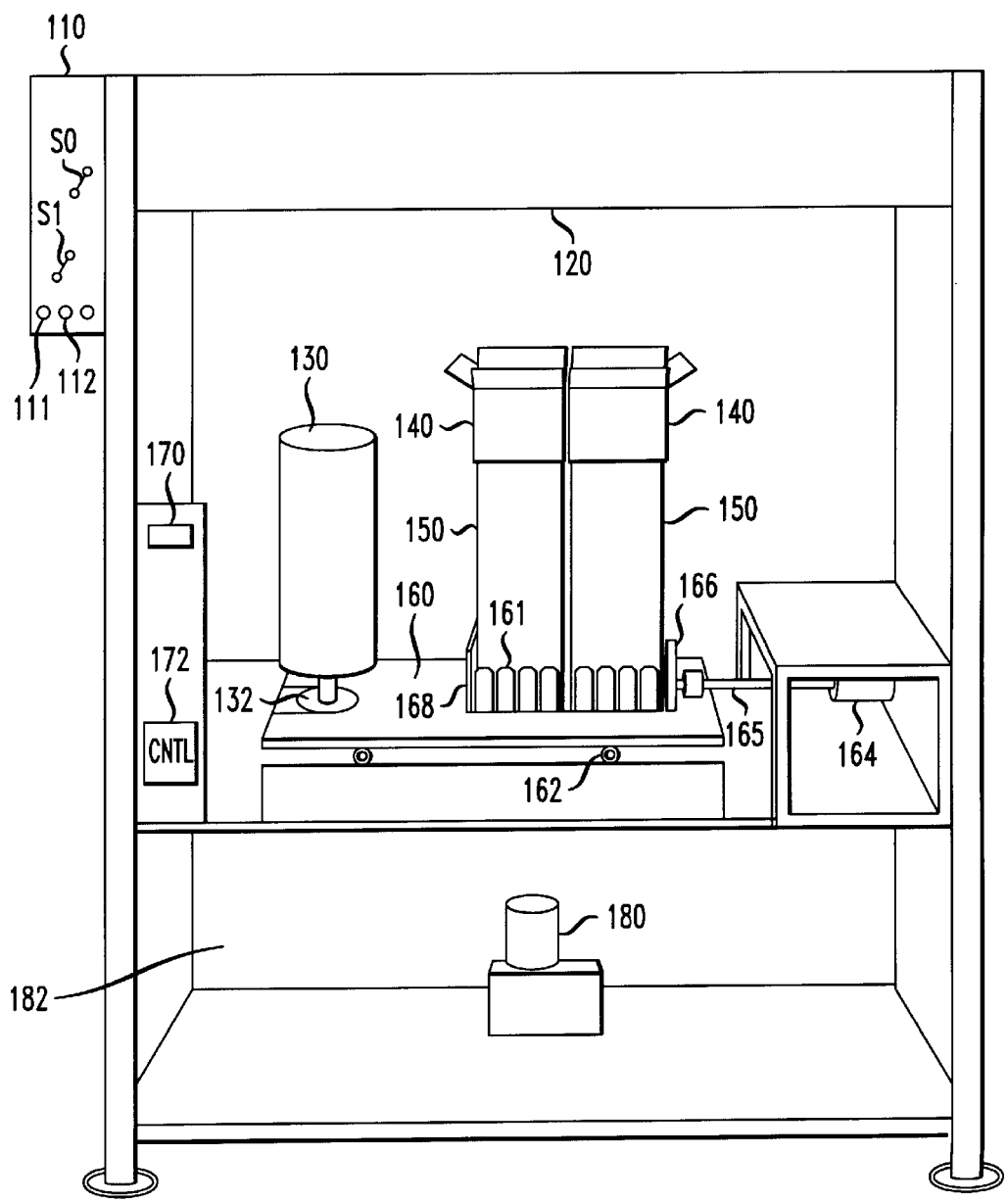
FIG. 1 is a front view of an exemplary automatic shaking system according to the invention.
Figure 2:
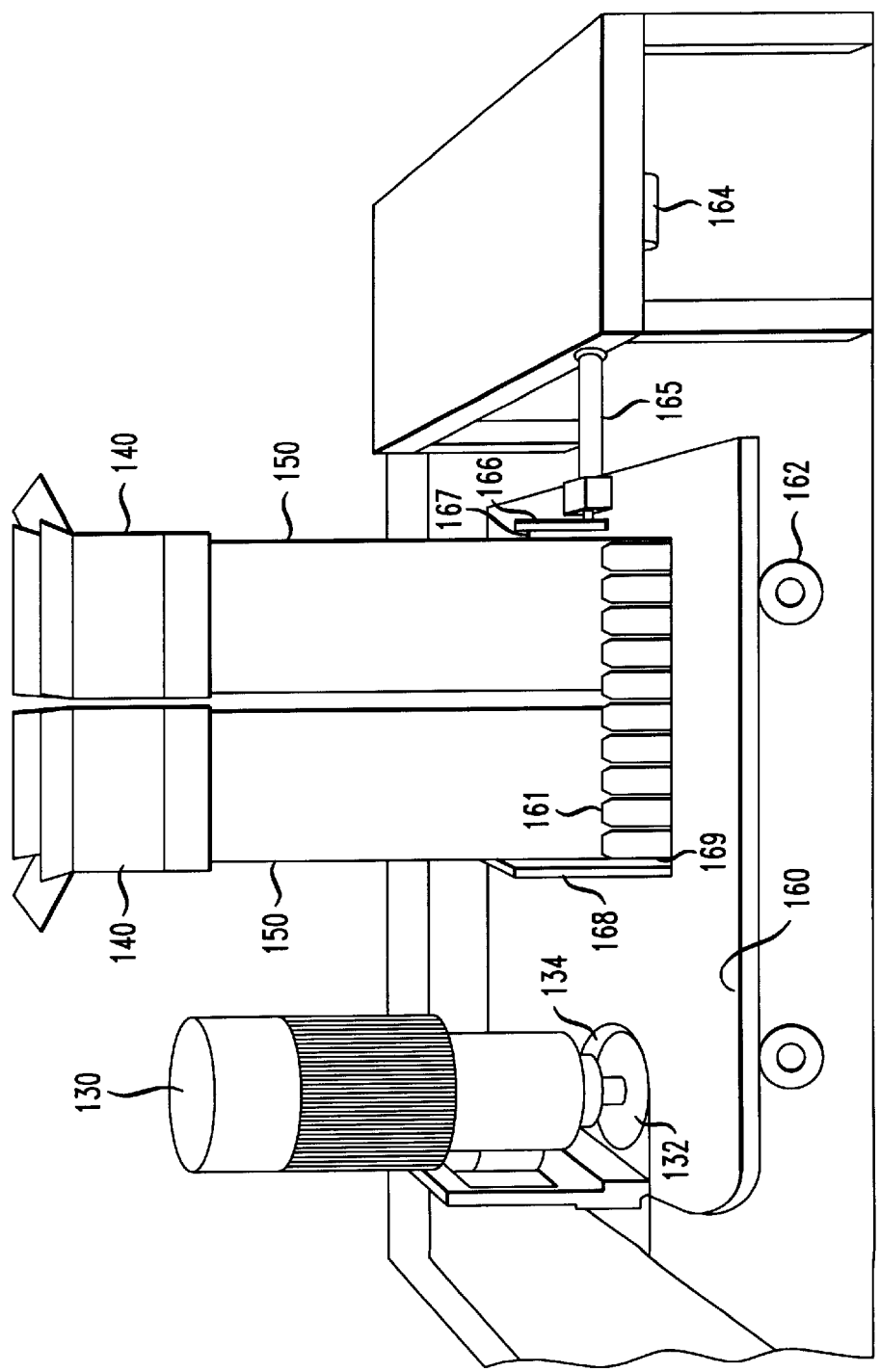
FIG. 2 is an enlarged view of the hopper and shaking mechanism of the system of FIG. 1.
Figure 6:
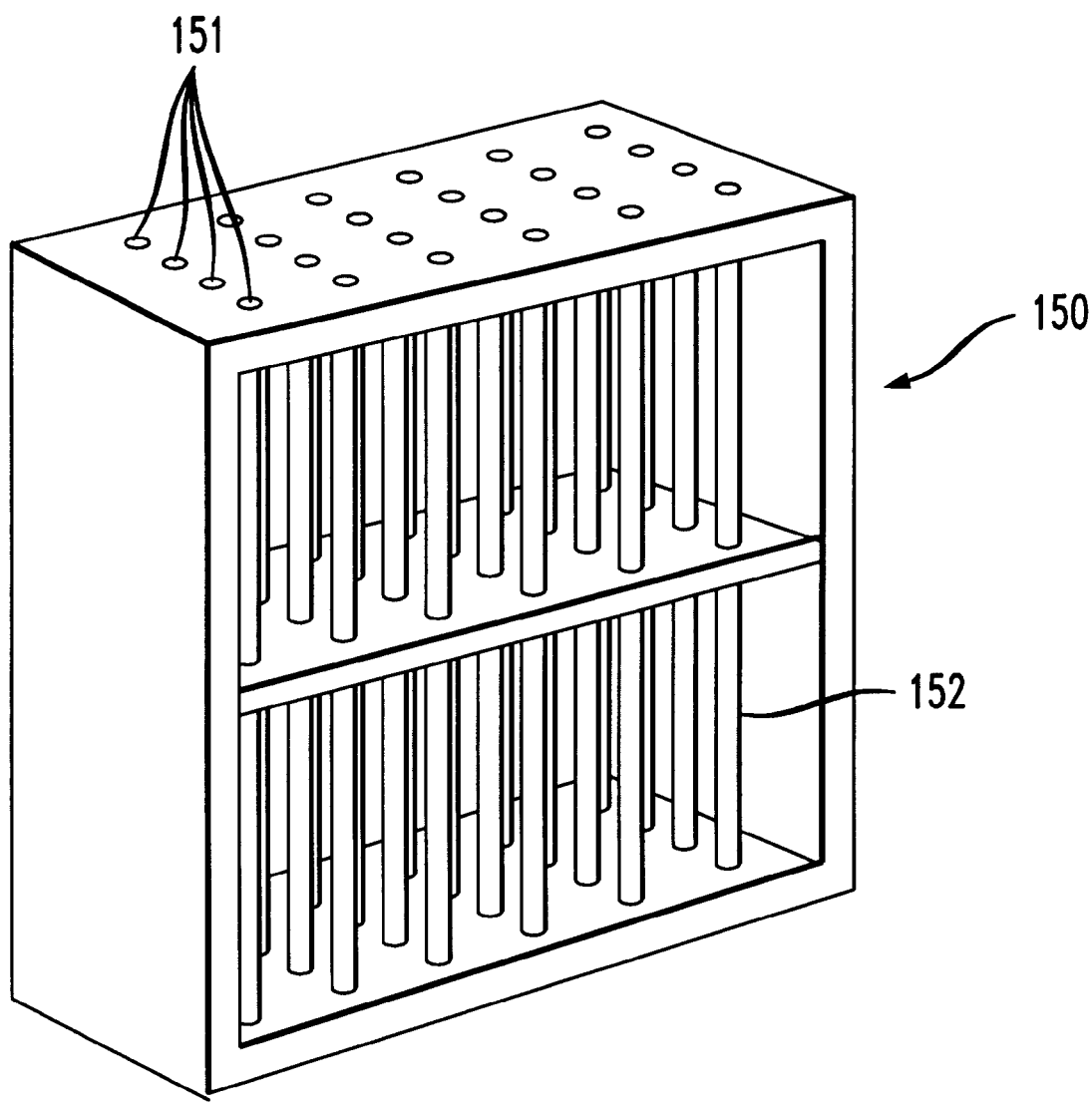
FIG. 6 is a cut-away view of a conventional compound tablet magazine.

FIGS. 1 and 2 show an exemplary feeding system 100. The system 100 has at least one hopper 140 for containing material, such as molding compound tablets or other pelletized material. At least one magazine 150 is provided, into which the material is fed by the hopper. In the example, two hoppers 140 and two magazines 150 are shown. The magazine 150 is capable of feeding the material into a molding machine (not shown) The magazine 150 may be of a conventional type, such as shown in FIG. 6, having a plurality of tubes 152 for receiving tablets of molding compound.

Feeding system 100 has a reciprocating slide plate 160 on which the magazine 150 is slidably seated. The reciprocating motion of the slide plate 160 causes the magazine 150 to move with a reciprocating motion, thereby causing the material to fall from the hopper 140 to the magazine.

In the exemplary embodiment, the magazine 150 slides relative to the slide plate 160. The slide plate 160 has a plurality of stops 161, 166, 168, located at least on each of two opposite sides of the magazine 150. The stops 161, 166, 168 limit the motion of the magazine 150 relative to the slide plate 160. Stop 161 includes at least one member projecting upward from the slide plate 160. In the example, a plurality of stops 161 are positioned in front of the magazine 150.

A fixed plate 168 is fixedly mounted to the left side of the left magazine 150. A movable plate 166 is movably positioned on the right side of the right magazine 150. Movable plate 166 is maintained at least at a minimum distance from the fixed plate 168, so that there is at least one gap 167, 169 (shown in FIG. 2) between the magazines 150 and the plates 166, 168. The gap(s) 167, 169 provide a limited range of positions within which the magazine 150 can freely slide relative to the slide plate 160, either from right to left or from left to right. For example, the gap size may be about 1.0 centimeter. A second movable plate (not shown) is positioned behind the back wall (not shown) of the magazine 150. The second movable plate (not shown) behind the magazine 150 is moved into position to lock the magazine (in the front-back direction) and prevent motion of the magazine (other than motion in the left-right direction).

Because the magazine 150 slides freely (in the left and right directions) relative to the slide plate 160, the reciprocating motion of the magazine lags behind the reciprocating motion of the plate. At some portions of the cycle of reciprocating motion, the magazine 150 may slide in the direction opposite to the current direction of motion of the slide plate 160. Because the magazine is allowed to slide freely, the motion of the magazine 150 is smooth, and substantially free from sudden changes in acceleration. This may reduce the amount of dust generated by the loading of the compound into the magazine.

In an alternative method of operating the apparatus, the movable plate 166 may be positioned to make the gap(s) 167, 169 sufficiently small so that magazine 150 contacts the fixed plate 168 and movable plate 166 at the end of each left-right movement. This type of motion provides a change in acceleration when the magazine 150 contacts either plate 166 or 168. One of ordinary skill can readily select either position of the movable plate 166 (and the corresponding magazine acceleration pattern) to provide the preferred magazine filling characteristics for any given type of material.

In the example, a pneumatic cylinder 164 actuates at least one of the stops, such as movable plate 166, to position the magazine 150. Cylinder 164 has a piston 165 that extends or retracts to position the plate 166. In the example, a solenoid valve 114 (discussed below with reference to FIG. 3) controls operation of the pneumatic cylinder 164.

A variety of mechanisms may be used to actuate the slide plate 160. In the exemplary embodiment, a motor 130 having a rotating cam 132 connected thereto is provided. In the exemplary embodiment, the reciprocal motion of the slide plate 160 has a low frequency of about 85 cycles per minute (corresponding to a motor speed of 85 rotations per minute). The cam 132 may be an eccentric cam or a round cam rotated about a point off the center of the cam. A cam follower 134 is driven by the cam 132. The cam follower 134 moves the slide plate 160 with reciprocating motion. The slide plate 160 is mounted for rolling on a plurality of bearings 162, allowing the slide pate to move smoothly.

The exemplary embodiment further includes an automatic dust removing mechanism. A dust collecting space 182 is positioned beneath the slide plate 160. A fan 120 is positioned above the hopper 140 and magazine 150. The fan 120 blows dust from above the slide plate 160 to the dust collecting space 182. A vacuum cleaner 180 removes the dust from the dust collecting space 182.

As an optional safety feature, the exemplary embodiment includes an optical sensor 170 that detects the presence of a person adjacent to the system 100. A control mechanism 172 turns the system 100 off when the sensor 170 detects the person. The control mechanism 172 may be a simple switch that is opened upon receipt of a signal from the sensor 170.

FIG. 1 also shows an operator control panel 110 for controlling the automatic operation of the system 100. The controls are discussed below with reference to FIGS. 3–5.

In the exemplary embodiment, the hopper 140 is a commercially available hopper from the Applied Precision Co. of Singapore. The magazine 150 is a commercially available magazine, also from Applied Precision. The motor 130 is a three-phase, 208 Volt AC motor. The molding machine (not shown) fed by the magazine 150 is an MGP molding machine manufactured by Fujiwa Co. of Japan. A process controller may optionally be used.

Figure 3:
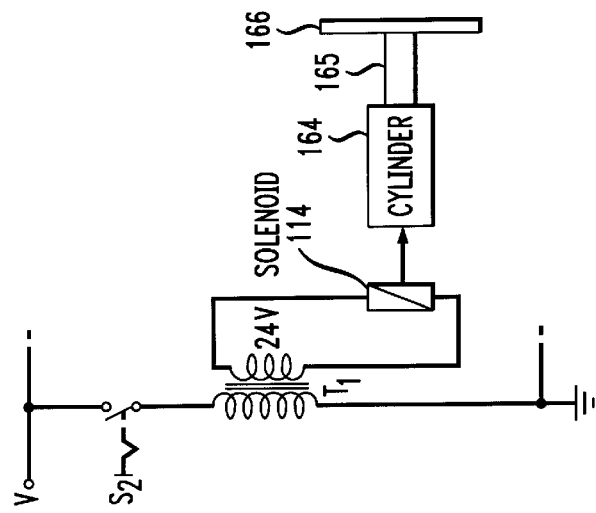
FIG. 3 is a schematic diagram of a circuit for controlling the actuating cylinder shown in FIGS. I and 2.

FIG. 3 is a schematic diagram of a control mechanism for the cylinder 164. A switch S2 couples the primary of a transformer T1 to a power source V. The solenoid 114 is connected to the secondary of the transformer T1. When the switch S2 is closed, the solenoid 114 is activated, and the cylinder 164 extends the piston 165 to move the plate 166 into position for shaking the magazine 150. When the switch S2 is opened, the solenoid 114 is de-activated, and the cylinder 164 retracts the piston 165 to move the plate 166 into position for removing the magazine 150.

Figure 4:
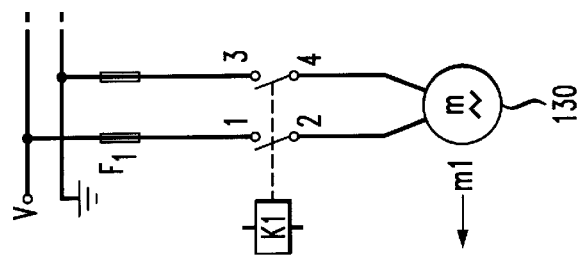
FIG. 4 is a schematic diagram of a circuit for supplying power to the motor shown in FIGS. 1 and 2.

FIG. 4 is a schematic diagram of the power supply circuit. A magnetic switch K1 is closed to activate the motor 130 (and opened to de-activate the motor). The magnetic switch may be a conventional device, such as a relay, or an equivalent thereof. A fuse or breaker device F1 is interposed between the power supply V and the motor 130. When power is supplied to the motor 130, the motor shaft rotates the cam 132, causing the reciprocating motion of the slide plate 160 to begin.

Figure 5:
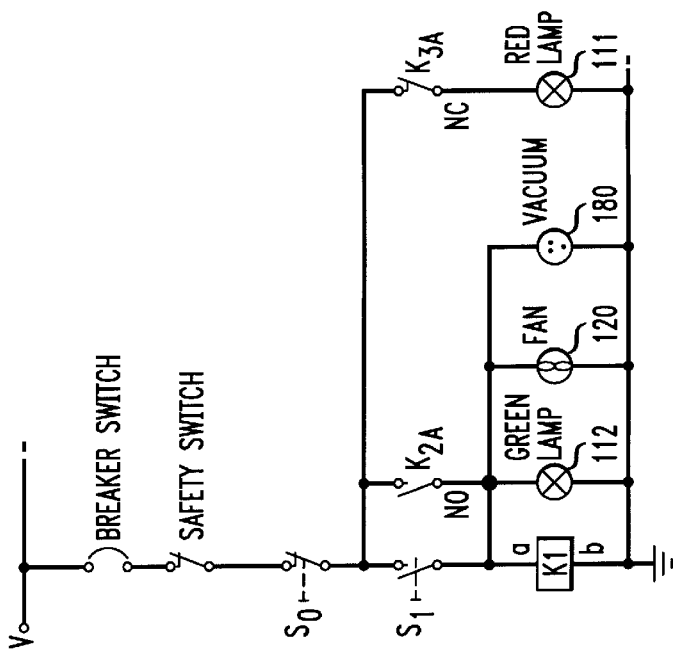
FIG. 5 is a schematic diagram of a circuit for controlling operation of the motor, fan and vacuum cleaner of FIGS. 1 and 2.

FIG. 5 is a schematic diagram of the control circuit. When the system 100 is in stand by mode ( no load ), the red lamp 111 is turned on. When switch S1 is pressed, magnetic switch K1 closes, and current flows through the safety switch and switch S0.

At this moment switch K2A changes status from No (opened) to Nc (closed). Then green lamp 112 is turned on, and red lamp 111 is turned off. The fan 120 operates together with the vacuum cleaner motor 180 to start removing dust from the system 100 When switch S0 is pressed, magnetic switch K1 is opened. Then switch K2A changes status from Nc (closed) to No (opened). The green lamp 112 is turned off, and the red lamp 111 is turned on. At the same time, the vacuum cleaner motor 180 and the fan 120 shut down.

In an exemplary method for loading a magazine 150 capable of feeding the material into a molding machine, a material to be loaded is placed into a hopper 140 above the magazine 150. A slide plate 160 is moved with a reciprocating motion. The magazine 150 is slidably seated on the slide plate 160, so that the reciprocating motion of the slide plate causes the magazine to move with a reciprocating motion, thereby causing the material to fall from the hopper 140 to the magazine.

In the preferred method, the reciprocating motion of the magazine is allowed to lag behind the reciprocating motion of the plate, and may actually include motion in a direction opposite that of the slide plate. The step of moving the slide plate 160 may include rolling the plate on a plurality of bearings.

The motion of the magazine 150 may be limited relative to the plate 160, using at least one stop 166, 168. The method may include using a pneumatic cylinder 164 to actuate the stop 166. The method may further include controlling operation of the pneumatic cylinder 164 with a solenoid valve 114.

Preferably, the method includes automatically blowing dust of the material from above the slide plate 160 to a dust collecting space 182 below the slide plate; and automatically vacuuming the dust from the dust collecting space.

A preferred method further includes detecting the presence of a person near the magazine 150, and automatically discontinuing the reciprocating motion of the slide plate 160 when the person is detected.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for loading a magazine capable of feeding material into a molding machine, comprising the steps of:

placing a material to be loaded into a hopper above the magazine;

moving a plate with a reciprocating motion, the magazine being slidably seated on the plate, so that the reciprocating motion of the plate causes the magazine to slide freely with a reciprocating motion, thereby causing the material to fall from the hopper to the magazine.

2. The method of claim 1, further comprising allowing the reciprocating motion of the magazine to lag behind the reciprocating motion of the plate.

3. The method of claim 1, wherein the step of moving the plate includes rolling the plate on a plurality of bearings.

4. The method of claim 1, further comprising the steps of:
automatically blowing dust of the material from above the plate to a dust collecting space below the plate; and
automatically vacuuming the dust from the dust collecting space.

5. The method of claim 1, further comprising the steps of:
detecting the presence of a person near the magazine, and
automatically discontinuing the reciprocating motion of the plate when the person is detected.

6. The method of claim 1, further comprising the step of limiting the motion of the magazine relative to the plate using at least one stop.

7. The method of claim 6, further comprising the step of using a pneumatic cylinder to actuate the at least one stop.

8. The method of claim 7, further comprising controlling operation of the pneumatic cylinder with a solenoid valve.

9. A feeding system, comprising:
a hopper for containing material;
a magazine into which the material is fed by the hopper, the magazine being capable of feeding the material into a molding machine;
a reciprocating plate on which the magazine is slidably seated, the reciprocating motion of the plate causing the magazine to slide freely with a reciprocating motion, thereby causing the material to fall from the hopper to the magazine.

10. The feeding system of claim 9, wherein the reciprocating motion of the magazine lags behind the reciprocating motion of the plate.

11. The feeding system of claim 9, further comprising:
a motor having a rotating cam connected thereto; and
a cam follower driven by the cam, the cam follower moving the plate with the reciprocating motion.

12. The feeding system of claim 9, further comprising a plurality of bearings, on which the plate rolls during the reciprocating motion.

13. The feeding system of claim 9, further comprising:
a dust collecting space positioned beneath the plate;
a fan that blows dust from above the plate to the dust collecting space; and
a vacuum cleaner that removes the dust from the dust collecting space.

14. The feeding system of claims 9, further comprising:
an optical sensor that detects the presence of a person adjacent to the system, and
control means for turning the system off when the sensor detects the person.

15. The feeding system of claim 9, wherein the plate has at least one stop on each of two opposite sides of the magazine, the stops limiting the motion of the magazine relative to the plate.

16. The feeding system of claim 15, further comprising a pneumatic cylinder for actuating at least one of the stops to position the magazine.

17. The feeding system of claim 16, further comprising a solenoid valve that controls operation of the pneumatic cylinder.

18. The feeding system of claim 17, further comprising:
a motor having a rotating cam connected thereto;
a cam follower driven by the cam, the cam follower moving the plate with the reciprocating motion;
a dust collecting space positioned beneath the plate;
a fan that blows dust from above the plate to the dust collecting space;
a vacuum cleaner that removes the dust from the dust collecting space;
a magnetic switch that activates the motor; and
a power switch that operates the magnetic switch, the fan and the vacuum cleaner.

19. The feeding system of claim 9, wherein the magazine has a plurality of tubes which receive the material from the hopper.

* * * * *